United States Patent [19]

Hsu

[11] Patent Number: 4,758,641
[45] Date of Patent: Jul. 19, 1988

[54] POLYCARBOXYLIC ACIDS WITH SMALL AMOUNT OF RESIDUAL MONOMER

[75] Inventor: Chin C. Hsu, Avon Lake, Ohio

[73] Assignee: The B F Goodrich Company, Akron, Ohio

[21] Appl. No.: 17,966

[22] Filed: Feb. 24, 1987

[51] Int. Cl.$^4$ .............................................. C08F 2/00
[52] U.S. Cl. ..................... 526/208; 526/216; 526/317.1
[58] Field of Search ............... 526/240, 230.5, 923, 526/208, 216, 317.1

[56] References Cited

U.S. PATENT DOCUMENTS

| | | | |
|---|---|---|---|
| 2,798,053 | 7/1957 | Brown | 526/271 |
| 3,896,084 | 7/1975 | Bolshakov et al. | 522/174 |
| 3,915,921 | 10/1975 | Schlatzer, Jr. | 526/318.41 |
| 3,940,351 | 2/1976 | Schlatzer, Jr. | 526/318.42 |
| 3,943,103 | 3/1976 | Borden et al. | 525/257 |
| 4,062,817 | 12/1977 | Westerman | 260/17.45 G |
| 4,066,583 | 1/1978 | Spaulding | 260/17.45 G |
| 4,151,143 | 4/1979 | Blank et al. | 524/533 |
| 4,267,103 | 5/1981 | Cohen | 526/216 |
| 4,375,533 | 3/1983 | Park et al. | 526/216 |
| 4,509,949 | 4/1985 | Huang | 526/317 |

Primary Examiner—Joseph L. Schofer
Assistant Examiner—N. Sarofim
Attorney, Agent, or Firm—George A. Kap; Alan A. Csontos

[57] ABSTRACT

A polymer of an olefinically unsaturated carboxylic acid containing 3 to 5 carbon atoms is prepared which contains less than 0.2% by weight unreacted monomer in a solvent selected from acetone and lower alkyl acetates also in the presence with less than 5% of a crosslinker selected from polyalkenyl polyethers of polyhydric alcohols containing more than one alkenyl group per molecule wherein the polyhydric alcohol contains at least 4 carbon atoms and at least 3 hydroxyl groups and initiator selected from peroxides and peroxydicarbonates. Polymerization temperature is 40° to 85° C. and viscosity of the mixture after completing polymerization is less than 1000 cps. About 1 to 10% of the carboxyl groups on the polymer are neutralized.

7 Claims, No Drawings

POLYCARBOXYLIC ACIDS WITH SMALL AMOUNT OF RESIDUAL MONOMER

BACKGROUND OF THE INVENTION

Polymers of unsaturated carboxylic acids and salts thereof are well known. These polymers include homopolymers and copolymers which contain up to 10 weight percent of other copolymerizable monomers. Typical monomers include acrylic acid, methacrylic acid, maleic acid or its anhydride, itaconic acid, and the like. U.S. Pat. No. 2,798,053, for instance, discloses copolymers of acrylic acid with small amounts of polyalkenyl polyether crosslinkers which are gel-like and, especially in the form of their salts, can absorb large quantities of water or solvents with subsequent substantial increase in volume. U.S. Pat. Nos. 3,940,351 and 4,062,817 describe polymers of an unsaturated carboxylic acid and at least one acrylic or methacrylic ester wherein the alkyl groups contain 1 to 30 carbon atoms. Such polymers are also effective thickening agents, even in the presence of substantial amounts of inorganic salts. U.S. Pat. Nos. 3,915,921 and 4,066,583 disclose preparation of same or similar polymers in similar systems.

U.S. Pat. No. 4,267,103 discloses polymers of unsaturated carboxylic acids or salts thereof in certain solvents wherein more than 1% by weight of the carboxyl groups are neutralized. Such polymers have molecular weight greater than 500 and up to several million, but generally, in the range of 10,000 to one million. Such polymers are also effective thickening agents.

SUMMARY OF THE INVENTION

Polymers of monounsaturated carboxylic acid monomers containing 3 to 5 carbon atoms, and salts thereof, which contain less than 0.2 weight percent unreacted monomers, are prepared by polymerizing one or more of the monomers at 40° to 85° C. with 0.1 to 1 weight percent initiators in acetone or a lower alkyl acetate solvent wherein the polymerization mixture at the start of polymerization contains less than 30 weight percent monomers and at completion of the polymerization, Brookfield viscosity of the mass in the reactor is below about 1000 cps, measured at 22° C. and at 60 rpm.

DETAILED DESCRIPTION OF THE INVENTION

In certain applications, such as cosmetics and pharmaceuticals, toxicity of ingredients is closely monitored and only ingredients which meet stringent requirements are used. In the case of thickening agents of the type disclosed herein, monomer conversion must be essentially complete with unreacted monomers being in the range of less than about 0.2% by weight, preferably less than about 0.1% by weight. For the purpose of converting weight percent to ppm, and vice versa, 0.1% by weight is equivalent to 1000 ppm.

Based on known prior art, it was impossible to produce polymers in ethyl acetate, such as polyacrylic acids, with residual monomer content of less than about 0.2% by weight. Reduction of residual monomer content or unreacted monomer, however, was accomplished by means of post treatments by addition of more initiator and higher reaction temperature. Post treatments of such polymers are undesirable because they are costly in that they require the use of additional initiator and additional time to complete them and for the reason that they result in degraded polymers. It is possible to produce such polymers with a low level of unreacted monomers below 0.2% by weight by polymerizing the monomers in the manner disclosed herein without the noted post treatments.

U.S. Pat. No. 4,267,103 is illustrative of prior art wherein there was a large amount of unreacted monomer in the polymer. Example I in the above patent describes polymerization of acrylic acid in ethyl acetate at 70° C. in the presence of allyl pentaerythritol crosslinker and lauroyl peroxide initiator. The carboxyl groups in the polymer were neutralized to the extent of 7.83% by means of sodium hydroxide. Conversion in this polymerization reaction was only 90%, note top of col. 8.

Example I of U.S. Pat. No. 4,267,103 was repeated in a 2-liter stirred reactor using the same procedure and the same amounts of ingredients specified in Example I. The polymers of the repeated Example I contained 1.03% by weight of unreacted acrylic acid, which was too high and unacceptable for purposes herein.

Other experiments of U.S. Pat. No. 4,267,103 were repeated but all of them contained a large amount of unreacted acrylic acid. The polymers of acrylic acids and other comonomers can be obtained in the manner described herein which contain a small amount of unreacted monomer on the order of less than 0.2% by weight, preferably less than 0.1% by weight.

The polymers of this invention include homopolymers and copolymers. The principal monomers are selected from monounsaturated monocarboxylic and dicarboxylic acids and salts thereof, of which at least 90% by weight, preferably at least 95% by weight, is used in a monomer mix. The secondary monomers or comonomers comprise up to 10% by weight, preferably up to 5% of the monomer mix. Molecular weight of such polymers is greater than about 500 and up to several million, preferably about 10,000 to about one million weight average molecular weight.

The principal monomers are selected from olefinically unsaturated monocarboxylic and dicarboxylic acids and salts thereof containing 3 to 5 carbon atoms, preferably monocarboxylic acids, salts and anhydrides thereof. Suitable monomers in this class include acrylic acid, methacrylic acid, ethacrylic acid, alpha-chloroacrylic acid, alpha-cyano acrylic acid, itaconic acid, maleic acid and maleic anhydride. In this class of monomers, acrylic acid, methacrylic acid, maleic acid and maleic anhydride are preferred because of generally lower cost, ready availability, and ability to form superior polymers. Acrylic acid is most preferred in this class of monomers.

The secondary monomers or comonomers are selected from monomers which contain at least one terminal $CH_2=C<$ or vinylidene group. Such comonomers include acrylic esters which are represented by the formula

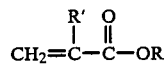

wherein R is an alkyl group containing 1 to 30 carbon atoms. This group of comonomers includes the acrylic acid esters with aliphatic groups wherein R contains 1 to 30, preferably 2 to 20 carbon atoms. In these comonomers, R' is hydrogen or a lower alkyl, preferably hydrogen or methyl group. Examples of the aliphatic acrylic esters include decycl acrylate, isodecyl acrylate, lauroyl acrylate, stearyl acrylate, behenyl acrylate, melissyl acrylate, methyl acrylate, ethyl acrylate, propyl acrylate, isopropyl acrylate, n-butyl acrylates, isobutyl acrylate, n-hexyl acrylate, heptyl acrylate, octyl acrylate, ethylhexyl acrylate, and the corresponding methacrylates.

Other suitable monomers can also be used as secondary comonomers. These include acrylamidosulfonic acids; acrylic nitriles such as acrylonitrile; acrylic amides such as acrylamide; N-alkylol amides such as N-methylol acrylamide; alpha olefins of 2 to 12 carbon atoms such as ethylene and propylene; dienes such as butadiene and piperylene; ethylidene norbornene and dicyclopentadiene; vinyl esters such as vinyl acetate and vinyl benzoate; vinyl aromatics such as styrene; vinyl and allyl ethers and ketones such as vinyl methyl ether and vinyl ketone; vinyl nitriles; cycloalkyl acrylates; vinyl halides and vinylidene halides such as vinyl chloride and vinylidene chloride; and other comonomers described in cols. 4 and 5 of U.S. Pat. No. 4,267,103.

The polymers may be cross-linked with any polyfunctional vinylidene monomer containing at least two terminal $CH_2=C<$ groups, including for example, butadiene, isoprene, divinyl benzene, divinyl naphthalene, allyl acrylates and the like. A particularly useful cross-linking monomer for use in preparing the copolymers, if one is employed, is a polyalkenyl polyether having more than one alkenyl ether grouping per molecule. The most useful of these possess alkenyl groups in which an olefinic double bond is present attached to a terminal ethylene grouping $CH_2=C<$. Efficiency of the polyether crosslinking agent increases with the number of potentially polymerizable groups on the molecule. It is preferred to utilize polyethers containing an average of two or more alkenyl ether groupings per molecule. Typical crosslinking agents are allyl pentaerythritol, allyl sucrose, trimethylolpropane diallyl ether, diallyl ethers of polyether diol with molecular weight of 50 to 1000, 1,6-hexanediol diacrylate, trimethylolpropane triacrylate, pentaerythritol triacrylate, tetramethylene diacrylate, ethylene diacrylate, triethylene glycol dimethacrylate, and the like. Crosslinking of the polymers provides improved ability for the copolymers to swell.

The polymeric mixtures contain up to about 5% by weight of crosslinking monomer based on the total of the carboxylic acid monomer, plus other monomers, if present, and more preferably 0.2 to 2.0 weight percent.

The solvents which are suitable herein are liquid at room temperature of 22° C. Suitable solvents are selected from acetone and lower alkyl acetates containing 1 to 6, preferably 2 to 4 carbon atoms in the alkyl group. Specific examples of such acetates include ethyl acetate, isopropyl acetate, n-butyl acetate, and the like. Amount of the solvent used should be such that the monomer solids content should be up to about 30% by weight, preferably 10 to 20%.

Amount of water in the solvent should be as low as possible since if water is allowed to exceed about 3% in the solvent, the reaction mass becomes a solid, rubbery mass, which is undesirable. Desirable results can be achieved by continuously removing water from the solvent as by passing the solvent through a distillation column or through a bed of a desiccant or a substance which will remove water from the solvent. This problem is compounded by the fact that the polymerization produces water as a by-product. However, water can be removed and amount thereof in the reaction mass can be controlled to a level below 3%, preferably 0 05 to 1%, in the solvent, in the manner described above.

Polymerization of the monomer in the solvent medium is usually carried out in the presence of a free radical initiator in a closed vessel in an inert atmosphere and under autogenous pressure or artificially-induced pressure, or in an open vessel under reflux at atmospheric pressure. Temperature of the polymerization may be varied from about 40° to 85° C., preferably 45° to 55° C. or 70° to 80° C., depending on the type of initiator selected. Suitable free radical initiators are those which will convert essentially all of the monomer to polymer at the reaction temperature. Examples of such free radical initiators include di(2-ethylhexyl) peroxydicarbonate, di(sec-butyl) peroxydicarbonate, di(isopropyl) peroxydicarbonate, dicyclohexyl peroxydicarbonate, dicetyl peroxydicarbonate, di(n-propyl) peroxydicarbonate, lauroyl peroxide, and other like peroxides and peroxydicarbonates. The di(2-ethylhexyl) peroxydicarbonate is effective at a reaction temperature of 45° to 55° C. whereas lauroyl peroxide is effective at a reaction temperature of 70° to 80° C. Amount of the initiator is generally less than 2%, preferably 0.4 to 1.0%, by weight based on the weight of the monomer charge.

To prevent gelling of the polymer, at least a part of the carboxyl groups should be neutralized with a group 1-A metal compound as the hydroxide, oxide or carbonate, and the like. Examples of these include lithium, sodium, potassium, cesium and the like; as well as reaction with ammonia and certain amines including morpholine, mono, di and triethanolamine, mono propanolamine, and other amines where the partial polymeric salt is less soluble in the reaction medium.

Preferably greater than 1 weight percent of the carboxyl groups on the monomer or the polymer are neutralized or formed into a salt of the above listed materials. More preferably, greater than 2 weight percent and up to about 10 weight percent of the carboxyl groups are neutralized or converted to the equivalent salt prior to polymerization. Normally, polar and medium to strongly hydrogen bonded solvents are not suitable as solvents for carboxyl containing polymers free of the salts because they swell the free acid containing polymers to gels, which is undesirable.

It is also important to recognize that the size of the reactor can influence polymerization results. It is one matter to carry out the polymerization reaction on a small scale, such as in a pop bottle or 1-liter or 2-liter reaction vessel, but it is a different matter to carry out the polymerization reaction on a large scale, such as a 30-gallon reactor or larger. Whereas the prior art has demonstrated certain polymerization reactions on a small scale, what is demonstrated and claimed herein is polymerization on a large scale.

EXAMPLE 1

This experiment demonstrates repetition of a prior-art example wherein a large content of unreacted monomer was obtained in the product. This example is not illustrative of the invention disclosed and claimed herein.

Example I of U.S. Pat. No. 4,267,103 was repeated using the same procedure and amounts of the ethyl acetate solvent, acrylic acid monomer, 50% caustic, allyl pentaerythritol crosslinker, and lauroyl peroxide initiator. A 2-liter stirred reactor was used. After one hour and forty-five minutes into the metering, the reactor contents became solid. The metering was stopped and the reaction was allowed to proceed for additional one hour and fifteen minutes. The resulting polymer cake was scraped from the reactor and dried in a Roto-Vap overnight at 95°–105° C. and 27″ vacuum. The resulting dried polymer was dissolved in water to yield 1%, 0.5% and 0.2% by weight solutions and neutralized with sodium hydroxide to pH of 7.3 to 7.8 range. The Brookfield viscosity values at 20rpm for the solutions were respectively 74,000 cps, 46,000 cps and 610 cps. The dried polymer contained 1.03% of unreacted acrylic acid.

EXAMPLE 2

This example demonstrates scale-up of a prior art example, which also resulted in an unacceptable polymer because it contained too much of residual or unreacted monomer. This example is not illustrative of the invention disclosed and claimed herein.

Here, Example II of U.S. Pat. No. 4,267,103 was scaled-up to a 2-liter reactor scale. Thus, 300 grams of acrylic acid was neutralized with 50% sodium hydroxide to 7% neutralization and this mixture was added to a 2-liter jacketed, stirred reactor along with 1200 grams of ethyl acetate containing 0.05% water and 1.5 grams of allyl pentaerythritol. This mixture was bubbled with nitrogen for thirty minutes to remove oxygen and then 0.15 grams of lauroyl peroxide was added and heated to reflux temperature of 77.2° C. The reaction was allowed to proceed for six hours and the reactor content was then dried in a Roto-Vap vacuum dryer at 95°–105° C. overnight. The resulting polymer contained residual acrylic acid of 1.77%. The 0.2%, 0.5%, 1.0% mucilage viscosity at pH of 7.3–7.8 was 11,400 cps, 46,000 cps, and 56,000 cps, respectively. Viscosity of the slurry after completion of polymerization was about 500 cps.

EXAMPLE 3

This example demonstrates scale-up of a prior art example, which also resulted in an unacceptable polymer because it contained too much of residual or unreacted monomer. This example is not illustrative of the invention disclosed and claimed herein.

Example III of U.S. Pat. No. 4,267,103 was scaled-up to a 2-liter reactor scale with 195 grams of acrylic acid neutralized to 4% with potassium carbonate, 1305 grams of ethyl acetate with 0.05% water content, 2.145 grams of allyl sucrose, and 0.78 grams of lauroyl peroxide as initiator. The reaction was carried out for six hours at 62° C. The resulting polymer had residual acrylic acid of 1.22% and the following mucilage viscosity:

| Mucilage Viscosity @ 20 rpm @ 25° C. | |
|---|---|
| 0.2% | 2,850 cps |
| 0.5% | 46,000 cps |
| 1.0% | 90,000 cps |

Viscosity of the slurry after completion of polymerization was about 400 cps.

EXAMPLE 4

This example is illustrative of the invention disclosed and claimed herein.

To a 30-gallon (850 liters) reactor, twenty-four pounds (10.9 Kg) of acrylic acid was added which was partially neutralized with 0.69 pound (0.313 Kg) of anhydrous potassium carbonate, which is equivalent to 3% of carboxylic acid being neutralized. The reactor was further charged with 176 pounds (79.9 Kg) of ethyl acetate containing 0.05% water, 0.2758 pound (0.125 Kg) of allyl pentaerythritol and sparged with nitrogen at room temperature for 30 minutes. At this point, added 54.5 grams of di(2-ethylhexyl) peroxydicarbonate and heated the reactor to 50° C. The reaction proceeded for a total of seven hours after the addition of the initiator. The reactor content was dropped to a 5 ft³ (141 liters) tumble dryer and dried under vacuum for 12 hours. The resulting polymer had residual acrylic acid content of 199 ppm and the following mucilage viscosities:

| Mucilage Viscosity @ 20 rpm, 25° C. | |
|---|---|
| 0.2% | 9,600 cps |
| 0.5% | 41,500 cps |
| 1.0% | 66,000 cps |

EXAMPLE 5

A series of polymerizations were run in a 30-gallon (850 liters) reactor following the same procedure as described in Ex. 4, above. Table I, below, gives the recipe and the resulting polymer properties.

TABLE I

| RUN NO. | RECIPE, LBS. (Kg) | | | | | MUCILAGE VISCOSITY CPS. | | | RESIDUAL AA, PPM |
|---|---|---|---|---|---|---|---|---|---|
| | GAA | K₂CO₃ | ETHYL ACETATE | CROSSLINKER | | EHP, phm | 0.2% | 0.5% | 1.0% | |
| 1 | 20 (9.08) | 0.958 (0.435) | 147 (66.74) | AS | 0.30 (0.136) | 0.5 | 4,300 | 35,000 | 47,500 | 998 |
| 2 | 24 (10.9) | 1.15 (0.522) | 176 (79.90) | AS | 0.269 (0.122) | 0.5 | 9,200 | 41,000 | 60,000 | 440 |
| 3 | 24 (10.9) | 0.691 (0.314) | 176 (79.90) | APE | 0.336 (0.153) | 0.5 | 5,500 | 66,000 | 106,000 | 1073 |

In the above table, "GAA" represents glacial acrylic acid, "K₂CO₃" is potassium carbonate, "AS" represents allyl sucrose crosslinker and "APE" represents allyl pentaerythritol crosslinker, "EHP" represents di(2-ethylhexyl) peroxydicarbonate initiator given in parts per hundred weight parts of the acrylic acid monomer (phm).

It should be noticed that residual acrylic acid is under 0.2% by weight or less than 2,000 ppm and the polymer of the first two runs had residual monomer content of less than 0.1% or less than 1000 ppm.

EXAMPLE 6

This example demonstrates the effect of water in the solvent on the polymerization reaction.

A series of polymerizations were run in a 2-liter reactor based on the recipe amount of raw materials given in Table II. First, the acrylic acid was partially neutralized with potassium carbonate and then charged to the reactor with ethyl acetate spiked to the indicated amount of water, and with allyl pentaerythritol. The reactor was then sparged with nitrogen for 30 minutes followed by addition of the initiator, i.e. di(2-ethylhexyl) peroxydicarbonate, and heated to the reaction temperature of 50° C. The reaction proceeded for six hours and the reactor content dried in a ROTO-Vap overnight at 95°-105° C. The resulting polymer was evaluted for mucilage viscosity at 0.2%, 0.5%, and 1.0% concentration in water after being neutralized to a pH between 7.3-7.8 with 18% NaOH solution. The results listed in Table II show the adverse effect of water.

TABLE II

| RUN NO. | GAA | $K_2CO_3$ | ETHYL ACETATE | % WATER IN ETHYL ACETATE | EHP | APE | MUCILAGE VISCOSITY CPS @ 20 RPM | | |
|---|---|---|---|---|---|---|---|---|---|
| | | | | | | | 0.2% | 0.5% | 1.0% |
| 1 | 180 | 5.18 | 1320 | 0.05 | 0.5 | 1.2 | 8,900 | 46,000 | 96,000 |
| 2 | 180 | 5.18 | 1320 | 0.20 | 0.5 | 1.2 | 7,400 | 44,000 | 86,000 |
| 3 | 180 | 5.18 | 1320 | 0.30 | 0.5 | 1.2 | 5,950 | 44,500 | 92,000 |
| 4 | 180 | 5.18 | 1320 | 0.40 | 0.5 | 1.2 | 4,850 | 52,000 | 96,000 |
| 5 | 180 | 5.18 | 1320 | 0.60 | 0.5 | 1.2 | 3,800 | 42,000 | 86,000 |
| 6 | 225 | 6.48 | 1275 | 3.25 | 0.5 | 0.9 | Discontinued | | |

In the above table, "GAA" represents glacial acrylic acid in grams, "$K_2CO_3$" represents potassium carbonate in grams, "EHP" represents the ethylhexyl peroxydicarbonate initiator in phm, "APE" represents allyl pentaerylbritol crosslinker also in phm. With 3.25% by weight water in the solvent, experiment of run #6 was discontinued because the mass in the reactor solidified.

It appears that water content in the solvent should be controlled so that it does not exceed about 2%, preferably less than 1% by weight of the solvent.

EXAMPLE 7

This example demonstrates usefulness of the copolymers as thickening agents.

A series of polymerizations were run in a 2-liter reactor following the procedure described in Example 6, above. In this series, a comonomer, was included in the monomer charge. The comonomers used included stearyl methacrylate (SMA), 2-ethylhexyl acrylate (EHA), N-t-butyl acrylamide (N-t-BuAm), and 2-acrylamido-2-methylpropane sulfonic acid (AMPS). These comonomers were copolymerized with acrylic acid and sodium acrylate in ethyl acetate. The recipe, reaction temperature and resulting polymer properties are listed in Table III, below:

On the basis of the results given in Table III, above, the copolymers can also function as effective thickening agents.

I claim:

1. A process conducted in the presence of less than about 1% of water for preparing a polymer from carboxylic monomer containing less than 0.2% of unreacted monomer having greater than 1% and less than 10% of the carboxyl groups of said monomer neutralized comprising polymerizing a monomer charge containing at least 90% of an olefinically unsaturated carboxylic acid monomer of 3 to 5 carbon atoms, a partially neutralized salt thereof, and mixtures thereof, in the presence of a solvent in which said carboxylic acid monomer, or a salt thereof, is soluble but in which said polymer is insoluble, said solvent is selected from the group consisting essentially of acetone, alkyl acetates of 1 to 6 carbon atoms in the alkyl group, and mixtures thereof; in the presence of 0.2 to 2.0 weight percent of monomer charge of a crosslinker; and in the presence of 0.4 to 1.0 weight percent of monomer charge of lauroyl peroxide initiator wherein reaction temperature is about 70° to 80° C. or in the presence of less than 2 weight percent of monomer charge of an initiator selected from the group consisting essentially of peroxydicarbonates wherein reaction temperature is about 45° to 55° C.

2. Process of claim 1 wherein amount of said solvent used is such that said monomer charge content in said solvent is less than 30% by weight; Brookfield viscosity of said polymer in said solvent after completion of polymerization is less than 1000 cps, measured at 60 rpm and at 22° C.; and amount of said peroxydicarbonate initiators is 0.4 to 1.0 weight percent.

3. Process of claim 1 wherein said monomer charge contains at least 95 weight percent of said carboxylic acid monomer or its salt; wherein said solvent is selected from acetone, ethyl acetate, isopropyl acetate, propyl acetate, butyl acetates, and mixtures thereof; and

TABLE III

| RUN NO. | RX. TEMP. °C. | RECIPE, GRAMS | | | | INITIATOR TYPE/PHM | CROSSLINKER TYPE/PHM | MUCILAGE VIS. CPS | |
|---|---|---|---|---|---|---|---|---|---|
| | | GAA | COMONOMER TYPE/GRAMS | $K_2CO_3$ | ETHYL ACETATE | | | 0.5% | 1.0% |
| 1 | 77 | 247.35 | SMA 7.65 | 11.87 | 1245 | LPO 0.6 | APE 0.6 | 16,000 | 20,500 |
| 2 | 50 | 213.75 | 2-KHA 11.25 | 6.48 | 1275 | KHP 0.5 | APE 0.9 | 37,250 | 64,600 |
| 3 | 50 | 213.75 | 2-KHA 11.25 | 6.48 | 1275 | KHP 0.5 | AS 0.8 | 39,500 | 67,000 |
| 4 | 77 | 285 | AMPS 15 | 14.40 | 1200 | LPO 0.18 | APE 0.6 | 33,100 | 51,000 |
| 5 | 77 | 285 | AMPS 15 | 14.40 | 1200 | LPO 0.18 | AS 0.6 | 34,750 | 57,000 |
| 6 | 77 | 285 | N—t-BuAM 15 | 14.40 | 1200 | LPO 0.18 | APE 0.6 | 21,400 | 30,350 |

In the above table, "RX.Temp. °C." represents the reaction temperature in degrees. Centigrade; "$K_2CO_3$" represents potassium carbonate which is given in grams; the initiators that were used included lauroyl peroxide (LPO) and di(2-ethylhexyl) peroxydicarbonate (EHP); and the crosslinkers that were used included allyl pentaerythritol (APE) and allyl sucrose (AS).

wherein said initiator is selected from lauroyl peroxide, di(2-ethylhexyl) peroxydicarbonate, di(sec-bytyl) peroxydicarbonate, di(isopropyl) peroxydicarbonate, dicyclohexyl peroxydicarbonate, dicetyl peroxydicarbonate, di(n-propyl) peroxydicarbonate, and mixtures thereof.

4. Process of claim 1 wherein amount of said solvent used is such that said monomer charge content in said solvent is 10 to 20% by weight and Brookfield viscosity of said polymer in said solvent after completion of polymerization is less than 1000 cps, measured at 60 rpm and at 22° C.

5. Process of claim 1 wherein said carboxylic acid monomer is selected from acrylic acid or its salt, methacrylic acid or its salt, maleic acid or its salt, maleic anhydride or its salt, itaconic acid or its salt, and mixtures thereof; and wherein said monomer charge contains at least 95% by weight of said carboxylic acid or its salt with remainder selected from alkyl acrylates containing 1 to 30 carbon atoms in the alkyl group.

6. Process of claim 5 wherein said monomer charge contains up to 10% by weight of a comonomer selected from alkyl acrylates containing 2 to 20 carbon atoms in the alkyl group, and mixtures thereof.

7. Process of claim 6 wherein said polymer contains less than 0.1% by weight of unreacted monomer; wherein said solvent is ethyl acetate; wherein said crosslinker is selected from allyl sucrose, trimethylol propane diallyl ether, diallyl ethers of polyether diols with molecular weight of 50 to 1000, allyl pentaerythritol, and mixtures thereof; and wherein said polymerization is carried out in a 30 gallon reactor or larger.

* * * * *